May 19, 1970     J. E. LAWTON     3,512,581
CRYOGENIC DEVICES

Filed July 2, 1968     2 Sheets-Sheet 2

Inventor
JOHN EDWARD LAWTON

By
Attorneys

United States Patent Office 3,512,581
Patented May 19, 1970

3,512,581
CRYOGENIC DEVICES
John E. Lawton, Ealing, London, England, assignor to British Insulated Callender's Cables Limited, London, England, and Central Electricity Generating Board, London, England
Filed July 2, 1968, Ser. No. 741,932
Claims priority, application Great Britain, July 3, 1967, 30,606/67
Int. Cl. F28d 21/00; H01b 7/34
U.S. Cl. 165—81                                31 Claims

ABSTRACT OF THE DISCLOSURE

A heat shield for cryogenic apparatus comprises inner and outer walls defining an annular space adapted to be evacuated and spaced apart by a number of longitudinal ducts for a cryogenic fluid distributed in spaced relationship around the annular space. At least one of the walls of the heat shield comprises a metal tube longitudinally divided into at least two parts which are thermally insulated from each other and are each supported partly by at least one of the ducts, to which it is attached, and partly by a body of heat insulating material, which preferably takes the form of a supporting tube lying in contact with that surface of the divided tube opposite to that which is attached to the ducts. Preferably the parts of the longitudinally divided metal tube are thermally insulated from each other by narrow longitudinal gaps maintained between their adjacent edges, for example by protuberances on the supporting tube of heat insulating material.

Figure 1:
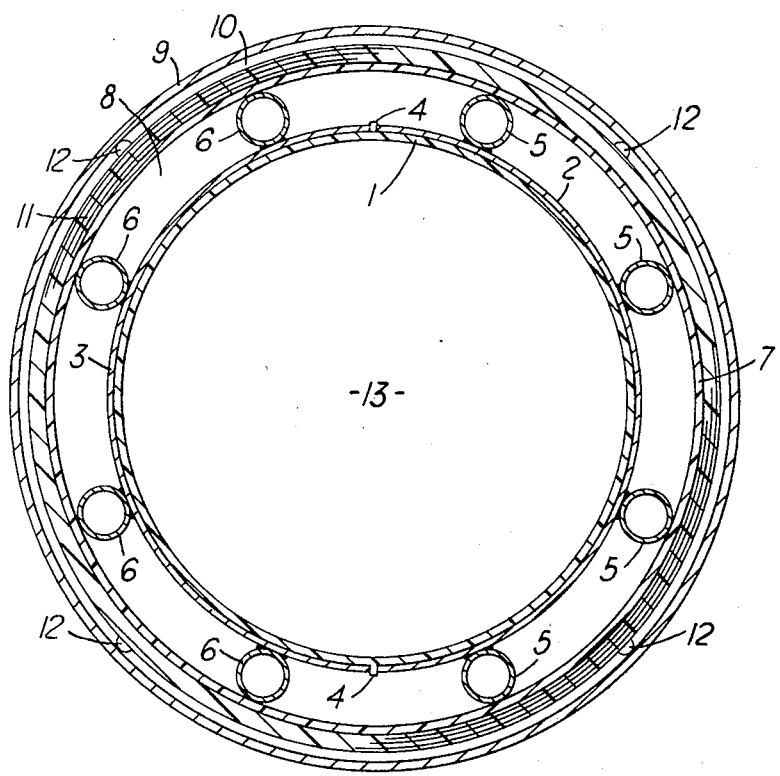

This invention relates to cryogenic apparatus, for example cryogenic electric cables and ducts for cryogenic fluids, of the kind incorporating an elongated tubular heat shield and is more particularly concerned with the construction of an elongated heat shield provided with spaced longitudinal cooling ducts adapted to carry a cryogenic fluid.

In devices of the kind to which the invention relates in which there are a number of longitudinal cooling ducts distributed around the heat shield and each carrying a cryogenic fluid, it is advantageous to cause such fluid to flow in one direction along the device in a first duct or group of ducts and in the reverse direction along the device in a second duct or group of ducts so that the overall rate of heat extraction by the fluid per unit length of the device does not vary unduly along the length of the shield, in spite of the temperature gradient that will inevitably exist along the lentgh of each duct. An object of the invention is to provide a device in which difficulties that might arise from the consequences of causing the fluid to flow in opposite directions along the various ducts are minimised.

In accordance with the present invention, the heat shield comprises inner and outer walls defining an annular space adapted to be evacuated and spaced apart by a number of longitudinal ducts for a cryogenic fluid distributed in spaced relationship around the annular space, at least one of the walls of the heat shield comprising a metal tube longitudinally divided into two or more parts which are thermally insulated from each other and are each supported partly by one or more of the ducts, to which it is attached continuously or at intervals, and partly by heat insulating material in contact with the parts, preferably in the form of a tube of the material lying in contact with that surface of the divided tube opposite to that which is attached to the ducts.

The preferred method of thermally insulating the parts of the divided metal tube from each other is to provide means for maintaining narrow longitudinal gaps between the adjacent edges of the parts, which gaps will automatically be evacuated when the annular space between the walls of the heat shield is evacuated. The spacing between the edges can for example be maintained by longitudinally continuous or spaced protuberances on a supporting tube of heat insulating material lying in contact with a surface of the divided tube or by pegs of heat insulating material fitted at intervals along each gap between the edges. Alternatively the metal part themselves can carry a continuous or intermittent coating thermal insulating material which provides the necessary spacing.

The gaps between the edges of the metal parts will be parallel to the ducts and consequently will be helical or straight in accordance with whether or not the ducts are arranged helically within the annular space.

Each duct preferably consists of a metal tube of circular cross section but the ducts can be of any suitable shape; each duct may for example be formed by attaching a channel shaped longitudinal metal member by its edges to the surface of the divided metal tube. When each duct is itself a complete metal tube it can either be continuously welded to the divided metal tube or attached to it at spaced intervals.

The metal used for ducts is preferably one having a very low thermal coefficient of expansion, for example a 40% nickel-iron alloy such as is sold under the trade name Nilo as Nilo 36. When the ducts are continuously attached to the divided metal tube the tube itself must also be made of the same metal but when the attachment is at longitudinally spaced intervals the divided tube can be made from a metal having a different thermal coefficient of expansion.

By arranging that no two of the ducts through which the cryogenic cooling fluid flows in opposite directions are attached to the same part of the divided metal tube, direct conductance of heat through the metal tube from one duct to the other is avoided. When all of the ducts carrying fluid flowing in one direction are arranged adjacent to each other it is necessary only to divide the metal tube longitudinally into two parts but when ducts carrying fluid flowing in opposite directions are arranged alternately or in alternate groups, it is necessary to divide the metal tube into the same number of parts as there are alternately arranged ducts or groups of ducts.

The divided metal tube preferably forms part of the inner wall of the heat shield and preferably is partly supported by a tube of heat insulating material lying inside the divided tube, the supporting tube preferably being a tube of plastics material, for example a polyvinyl chloride composition. The other wall defining the evacuable annular space, usually the outer wall of the heat shield, is preferably also a tube of heat insulating material, for example polyvinyl chloride.

The invention also includes a cryogenic envelope incorporating such a heat shield and an electric cable provided with such an envelope.

Figure 2:
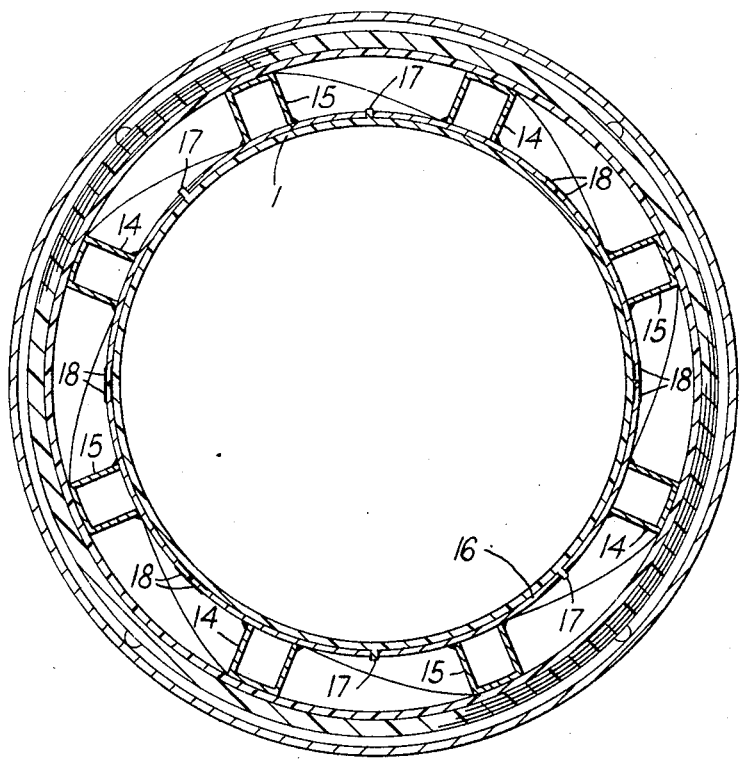
Figure 3:
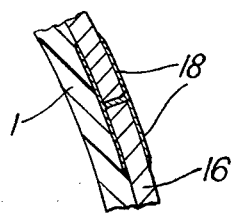

In order that the invention may be more fully understood, it will be further described by way of example with reference to the accompanying drawings, wherein FIG. 1 is a cross-section of a cryogenic envelope incorporating a preferred form of heat shield, FIGURE 2 is a composite cross-section showing a number of modifications that may be made to the cryogenic envelope of FIG. 1, and FIG. 3 is a fragmentary view showing in more detail a portion of FIG. 2, The inner wall of the envelope shown in FIG. 1 is a tube 1 of a polyvinyl chloride composition which supports on its outer surface a tube of 40% nickel-iron alloy divided longitudinally into two parts 2, 3 spaced apart by pegs 4 of polyvinyl chloride (P.V.C.) which are integral with and project radially outwards from the outer surface of the inner tube. The gap may be made narrower than the diameter of the pegs and the pegs each located in opposed notches in the edges of the two parts of the metal tube. If one or more pegs per section in each groove fit into the notches in such a way as to prevent relative longitudinal displacement between the inner tube and the divided metal tube then it may be necessary that the remaining slots should be of sufficient length to permit such displacement under thermal expansion and contraction.

To each of the metal parts 2, 3 of the divided tube an equal number of cooling ducts 5, 6 of circular cross section and of the same metal are continuously welded, the ducts each being straight and being spaced apart by a distance which is large in comparison with their diameter. A second tube 7 of P.V.C. composition is supported concentrically with the first tube on the outer extremities of the cooling ducts, to form a uniform annular space 8 between its inner wall and the outer surface of the divided metal tube. This second P.V.C. tube 7 is itself enclosed by a steel tube 9 spaced therefrom to provide an annular space 10 partly filled with laminated super insulation 11. The spacing between the steel tube and the outer P.V.C. tube is maintained by thermal insulating load bearing supports 12 of a known form, for example built up from a number of thin metal and/or ceramic washers. The super insulation 11 may for example consist of aluminium foils spaced by glass fibre netting or aluminised plastics material crinkled to provide its own spacing means.

When the cryogenic device is in use, both the outer annular space 10 containing the super insulation and the inner annular space 8 around the divided metal tube will be evacuated and a cryogenic fluid, for example liquid nitrogen or a mixture of nitrogen gas and liquid nitrogen, will be passed through the cooling ducts. The space 13 within the inner supporting the tube can be used to house the insulated and cooled conductors of a cryogenic or super-conductive cable to form or house a duct for a cryogenic fluid.

The cryogenic fluid flowing through the cooling ducts will flow in one direction along the ducts 5 attached to the part 2 of the divided tube and in the other direction along the ducts 6 attached to the part 3 of the divided tube. There are four ducts attached to each part and each consists of a tube of circular cross-section. Suitably each duct has a diameter less than one tenth of the diameter of the divided tube when the latter is of about 30 cm. diameter. The number and size of ducts may vary, and for example two ducts each of less than half the diameter of the divided tube might be attached to each part of a divided tube of about 6 cm. diameter.

In the alternative arrangement shown in FIG. 2, the coolant ducts 14, 15 are helically arranged and the metal tube 16 is divided between each adjacent pair of ducts. Two alternative methods of thermally insulating the parts of the tube 16 are shown. In the first arrangement a continuous helical rib 17 is provided on the P.V.C. tube 1 which forms the inner wall of the heat shield, and this rib enters the gap between adjacent parts of the metal tube 16. In the second arrangement, seen more clearly in FIG. 3, the parts of the tube 16 are provided along their adjacent edges with a continuous or discontinuous coating 18 of thermally insulating material. It may in some cases be possible when longitudinally continuous coatings 18 are used to cause each adjacent pair of coatings 18 to adhere to each other in such a way that the provision of the internal supporting tube 1 becomes unnecessary.

In use, the cryogenic coolant will flow in one direction in ducts 14, and in the opposite direction in alternate ducts 15.

FIG. 2 also shows an alternative construction of duct. Instead of the circular tubes used in the construction shown in FIG. 1, longitudinal metal members of channel section are attached by their edges, as by welding, to the parts of the tube 16, to form ducts 14, 15 of approximately rectangular cross-section.

By making the cooling ducts, and preferably but not essentially the divided tube, of an alloy having a thermal coefficient of expansion that is so low that their longitudinal contraction and expansion between cryogenic temperatures (specifically the temperature of the cooling fluid) and normal temperatures can be absorbed as a non-distorting stress in the metal, a heat shield can be obtained that can be rigidly supported at its ends without the need for bellows connections or other devices for absorbing longitudinal expansion.

What I claim as my invention is:

1. In a heat shield for cryogenic apparatus comprising inner and outer walls defining an annular space adapted to be evacuated:
    (a) a number of longitudinal ducts for a cryogenic fluid distributed in the said annular space and spacing the said walls apart;
    (b) at least one wall comprising a metal tube longitudinally divided into at least two parts each attached to and partly supported by a respective one of the said longitudinal ducts;
    (c) at least one body of heat insulating material partly supporting the parts of said divided tube; and
    (d) means for thermally insulating the parts of the divided metal tube from one another.

2. A heat shield as claimed in claim 1 in which a body of heat insulating material partly supporting the parts of the divided metal tube comprises a supporting tube lying in contact with that surface of the divided tube opposite to that which is attached to the ducts.

3. A heat shield as claimed in claim 1, comprising means for maintaining the parts of the longitudinally divided metal tube spaced from each other to form narrow longitudinal gaps between their adjacent edges to thermally insulate the parts from one another.

4. A heat shield as claimed in claim 1 comprising
    (a) a body of heat insulating material comprising a tube composed of heat insulating material lying in contact with that surface of the divided tube opposite to that which is attached to the ducts, and
    (b) protuberances on the said tube of heat insulating material to maintain the parts of the longitudinally divided tube spaced from each other to form narrow longitudinal gaps between their adjacent edges, to thermally insulate the parts from one another.

5. A heat shield as claimed in claim 1, wherein pegs of heat insulating material are fitted at intervals between the parts of the longitudinally divided metal tube to space the parts from one another and form narrow longitudinal gaps to thermally insulate the parts from one another.

6. A heat shield as claimed in claim 1, wherein a coating of thermal insulating material is provided on at least one of each adjacent pair of edges of the parts of the said divided metal tube to thermally insulate the parts from one another.

7. A heat shield as claimed in claim 1 in which the parts of the divided metal tube and the ducts for cryogenic fluid are all straight and parallel to the axis of the heat shield.

8. A heat shield as claimed in claim 1 in which the parts of the divided metal tube and the ducts for cooling fluid are all helical and have the same pitch.

9. A heat shield as claimed in claim 1 in which the ducts for cooling fluid consists of metal tubes of circular cross-section.

10. A heat shield as claimed in claim 1 in which at least one duct for cooling fluid is formed by a channel-shaped longitudinal metal member continuously attached by its edges to the surface of the divided metal tube.

11. A heat shield as claimed in claim 1 wherein the ducts for cooling fluid are composed of a material having a very low thermal coefficient of expansion.

12. A heat shield as claimed in claim 1 wherein the ducts for cooling fluid and a divided metal tube are each composed of a material having a very low thermal coefficient of expansion.

13. A heat shield as claimed in claim 1 wherein the divided metal tube forms part of the inner wall of the heat shield.

14. A heat shield as claimed in claim 1 wherein the other wall defining the evacuable annular space is a tube of heat insulating material.

15. A cryogenic envelope comprising
   (a) an outer enclosure,
   (b) the heat shield claimed in claim 1, and
   (c) heat insulating means supporting the heat shield in the outer enclosure.

16. Cryogenic apparatus comprising the cryogenic heat shield claimed in claim 1.

17. An electric cable comprising
   (a) at least one insulated and cooled conductor,
   (b) the cryogenic heat shield claimed in claim 1 enclosing the conductor,
   (c) an outer enclosure, and
   (d) heat insulating means supporting the heat shield in the outer enclosure.

18. In a heat shield for cryogenic apparatus comprising inner and outer walls defining an annular space adapted to be evacuated:
   (a) a number of longitudinal ducts for a cryogenic fluid distributed in the said annular space and spacing the said walls apart,
   (b) the inner wall comprising
      (i) a metal tube longitudinally divided into at least two parts each attached by its radially outer surface to, and partly supported by, a respective one of said ducts, and
      (ii) a tube of heat insulating material in contact with the radially inner surface of, and partly supporting the parts of, the divided metal tube, and
   (c) means for maintaining the parts of the divided metal tube spaced from each other to from narrow longitudinal gaps between their adjacent edges to thermally insulate the parts from one another.

19. In the heat shield claimed in claim 18, the means for maintaining the parts of the divided metal tube spaced from one another comprising protuberances on the said tube of heat insulating matetrial in contact with the radially inner surface of the divided metal tube.

20. A heat shield as claimed in claim 18, wherein pegs of heat insulating material are fitted at intervals between the parts of the longitudinally divided metal tube to space the parts from one another and form narrow longitudinal gaps to thermally insulate the parts from one another.

21. A heat shield as claimed in claim 18, wherein a coating of thermal insualting material is provided on at least one of each adjacent pair of edges of the parts of the said divided metal tube to thermally insulate the parts from one another.

22. A heat shield as claimed in claim 18 in which the parts of the divided metal tube and the ducts for cryogenic fluid are all straight and parallel to the axis of the heat shield.

23. A heat shield as claimed in claim 18 in which the parts of the divided metal tube and the ducts for cooling fluid are all helical and have the same pitch.

24. A heat shield as claimed in claim 18 in which the ducts for cooling fluid consist of metal tubes of circular cross-section.

25. A heat shield as claimed in claim 18 in which at least one duct for cooling fluid is formed by a channel shaped longitudinal metal member continuously attached by its edges to the surface of the divided metal tube.

26. A heat shield as claimed in claim 18 wherein the ducts for cooling fluid are composed of a material having a very low thermal coefficient of expansion.

27. A heat shield as claimed in claim 18 wherein the ducts for cooling fluid and a divided metal tube are each composed of a material having a very low thermal coefficient of expansion.

28. A heat shield as claimed in claim 18 wherein the other wall defining the evacuable annular space is a tube of heat-insulating material.

29. A cryogenic envelope comprising
   (a) an outer enclosure,
   (b) the heat shield claimed in claim 18, and
   (c) heat insulating means supporting the heat shield in the outer enclosure.

30. Cryogenic apparatus comprising the cryogenic heat shield claimed in claim 18.

31. An electric cable comprising
   (a) at least one insulated and cooled conductor,
   (b) the cryogenic heat shield claimed in claim 18 enclosing the conductor,
   (c) an outer enclosure, and
   (d) heat insulating means supporting the heat shield in the outer enclosure.

References Cited

UNITED STATES PATENTS

| | | | |
|---|---|---|---|
| 1,841,762 | 1/1932 | Samesreuther et al. | 165—136 X |
| 2,773,513 | 12/1956 | Isenberg | 138—111 |
| 3,390,357 | 6/1968 | Thomson | 174—15 |
| 3,409,731 | 11/1968 | Fink et al. | 174—15 |

ROBERT A. O'LEARY, Primary Examiner

A. W. DAVIS, Jr., Assistant Examiner

U.S. Cl. X.R.

62—45; 138—105, 111, 114; 165—136, 164, 168; 174—15